United States Patent [19]

Corning

[11] 4,084,931

[45] Apr. 18, 1978

[54] PLASTIC MOLDING APPARATUS

[76] Inventor: Bly A. Corning, 1902 Hampden Rd., Flint, Mich. 48503

[21] Appl. No.: 718,787

[22] Filed: Aug. 30, 1976

[51] Int. Cl.$^2$ ............................................... B29F 1/05
[52] U.S. Cl. .................................... 425/218; 425/556; 425/436 RM
[58] Field of Search ............... 425/287, 302 B, 302 R, 425/305 B, 305 R, DIG. 212, 218, 297, 436 RM, 301, 242 R; 264/161; 83/171

[56] References Cited

U.S. PATENT DOCUMENTS

| 2,759,221 | 8/1956 | Edwards | 425/251 X |
| 3,752,629 | 8/1973 | Gordon | 425/305 B |
| 3,761,300 | 9/1973 | Huffman et al. | 83/171 X |

FOREIGN PATENT DOCUMENTS

| 2,210,814 | 9/1973 | Germany | 264/161 |

Primary Examiner—J. Howard Flint, Jr.
Assistant Examiner—William R. Briggs
Attorney, Agent, or Firm—Barnes, Kisselle, Raisch & Choate

[57] ABSTRACT

Injection plastic molding apparatus comprising a pair of dies movable horizontally relative to one another between a closed molding position and an opened position. A nozzle is engageable with the dies for injecting plastic into the cavities thereof when the dies are in closed position to form a part. A hot wire is mounted on one of the dies such that when they are moved relative to one another to an open position, the hot wire will engage any drool of plastic which may occur between the nozzle and the part. Means are provided for energizing the wire at a temperature sufficient to melt and sever the drool permitting the part to fall under the action of gravity.

6 Claims, 9 Drawing Figures

U.S. Patent  April 18, 1978  Sheet 1 of 3  4,084,931
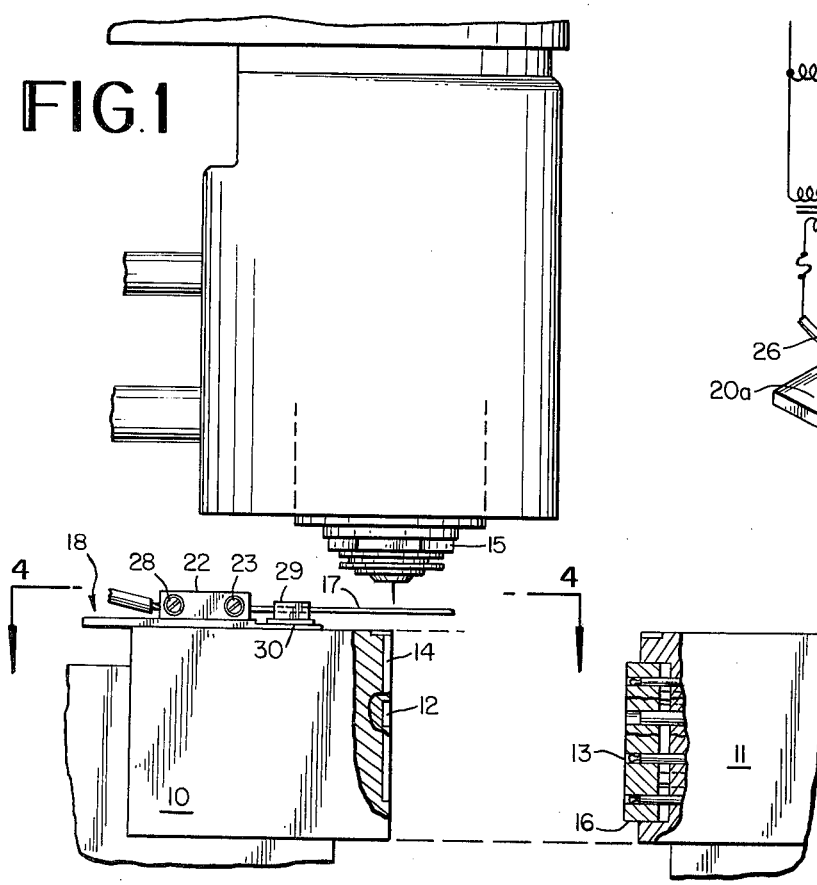
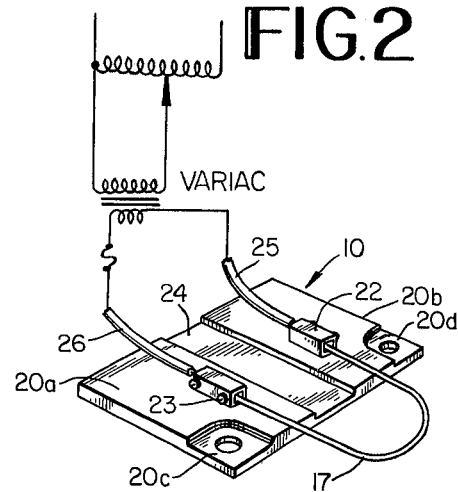
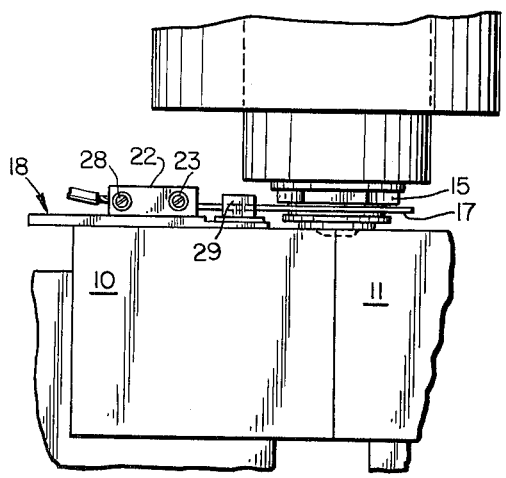
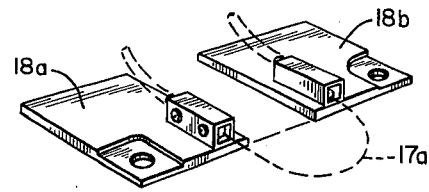

PLASTIC MOLDING APPARATUS

This invention relates to injection type plastic molding apparatus and particularly to the removal of parts from such apparatus.

BACKGROUND AND SUMMARY OF THE INVENTION

In injection plastic molding of small plastic parts wherein dies are movable horizontally between closed and open positions and a nozzle is movable into engagement with the dies to inject plastic into the dies and thereafter the parts are ejected upon movement of the dies to an open position by permitting the parts to fall downwardly under the action of gravity, it is common, where the parts are small and light, for a small thin thread or "drool" of plastic to retain the parts to the nozzle. Heretofore various methods have been attempted to remove the parts such as knives and the like. However, because of the small weight of the parts, these have not been proven effective and it is common to have a worker at the machine manually removing the parts.

Accordingly, among the objects of the invention are to provide an apparatus and method for effectively and efficiently removing the parts from the apparatus.

DESCRIPTION OF THE DRAWINGS

FIG. 1 is a fragmentary part sectional elevational view of an apparatus embodying the invention.

FIG. 2 is a partly diagrammatic perspective view of a portion of the apparatus.

FIG. 3 is a view similar to FIG. 1 showing the parts in plastic molding position.

FIG. 7 is a fragmentary perspective view of a modified form of apparatus.

DESCRIPTION

Figure 8:
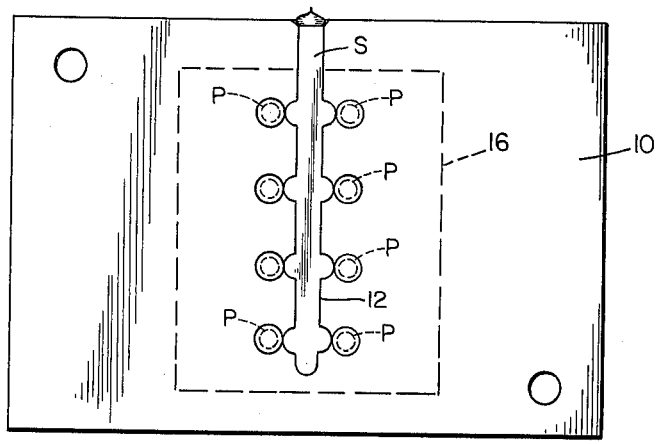
FIG. 8 is an end view of a portion of the die shown in FIG. 1.
Figure 9:
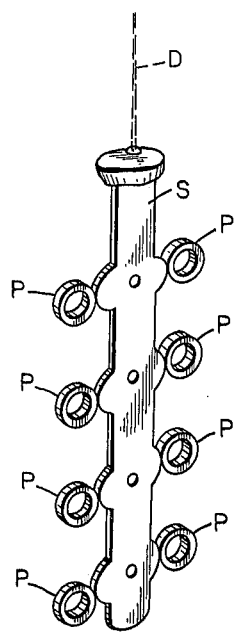
FIG. 9 is a perspective view showing a typical group of parts as made on the apparatus.

Referring to FIG. 1, a common type of injection type plastic molding machine comprises dies 10, 11 having a plurality of cavities 12, 13 that cooperate when the dies are closed to form one or more parts when organic plastic is injected through a runner formed by grooves or leads 14. A typical "short" is shown in FIGS. 8 and 9 wherein the parts P are connected by a sprue S.

The die 10 is stationary and die 11 is movable as by a cylinder. When the dies 10, 11 are in a closed position as shown in FIG. 3, a nozzle 15 is moved downwardly to inject plastic through the runners 14 into the cavities 12, 13. When the dies 10, 11 are opened and an ejector plate 16 on movable die 11 is actuated, the parts are pushed outwardly from the cavity 13 and normally would fall by gravity. However, when the charge or shot is light such as on the order of one ounce of plastic, there may be a tendency for a thin hair D of plastic, known as a "drool", to form between the nozzle and the shot of parts as the nozzle moves away from the dies and the movable die carries the parts outwardly and thereby retain the parts and prevent them from falling downwardly. Since the next operating cycle cannot be initiated until the part is removed, the maximum production of the machine cannot be achieved.

In accordance with the invention, a thin loop of wire 17 such as 0.030 nichrome wire is mounted on one of the dies 10, 11. The wire 17 is heated to a temperature sufficient to melt and sever the drool so that when the dies 10, 11 are open, the wire engages the drool severing the drool and permitting the parts to fall by gravity.

As shown in FIGS. 1–5, the wire 17 is mounted on a mounting member 18 which, in turn, is mounted on the die 10. Specifically, the mounting member 18 comprises a glass reinforced resin base 19 in the form of a flat plate with a layer 20 of copper thereon and a layer of insulating paint 21 overlying the copper 20.

The ends of the wire 17 are held on connectors or terminal blocks 22 by screws 23. The connectors 22 are soldered directly to the copper 20. The ends of wire 17 are preferably bent into a small U-shape to provide for a better electrical connection with screws 23. In the event that the member 18 is prefabricated, portions of the paint layer 21 are removed to provide for soldering connectors 22 onto the layer 20 of copper. In addition, a central portion 24 of the mounting member 18 is provided without the copper layer 20 so that in effect two isolated copper layers 20a, 20b are provided. Leads 25, 26 of the control circuit are connected by screws 27 to the connectors 22. The heads of screws 23, 27 face outwardly to facilitate attachment of wires 17, 25 and 26. In this manner, the wire 17 is mounted on the die in such a manner that the heat from the wire is not directly transmitted to the die but is dissipated throughout the copper layers. As a result, the normal functioning of the die will not be adversely affected by the heat from the wire 17 and the parts such as connectors 22 have longer life. In addition, portions 20c, 20d of the copper layer are removed to permit bolts 29 to be used to mount member 18 on the die. Fiber washers 30 are provided between the heads or bolts 29 and mounting member 18.

As shown in FIG. 2, the circuit through the leads 25, 26 is from a power source such as 120 volts alternating current through a variable device such as a Variac and then through a transformer that reduces the voltage passing to the nichrome wire 17 and produces heating of wire 17.

Figure 4:
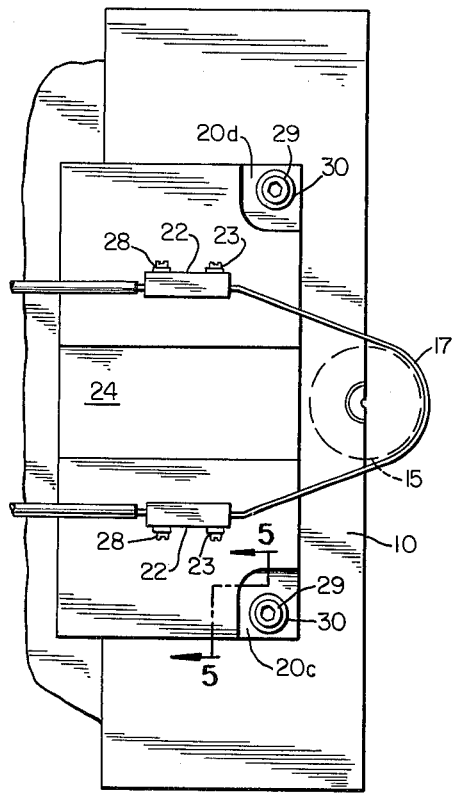
FIG. 4 is a fragmentary sectional view taken along the line 4—4 in FIG. 1.
Figure 5:
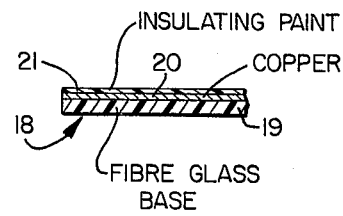
FIG. 5 is a fragmentary sectional view taken along the line 5—5 in FIG. 4.
Figure 6:
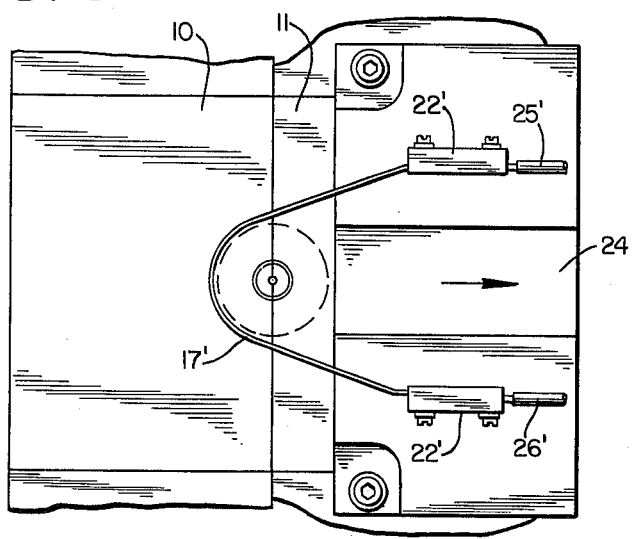
FIG. 6 is a fragmentary plan view of a modified form of the invention.

In use, the nichrome wire functions effectively to sever the parts and prevent the drool from retaining the parts to the nozzle. The copper layer facilitates dissipation of the heat. The connectors permit ready replacement of wire 17. As shown in FIG. 6, the mounting plate 18' can be mounted directly on the movable die instead of on the fixed die.

Alternatively, as shown in FIG. 7, the base can be made as two separate parts 18a, 18b supporting hot wire 17a to accommodate a particular molding machine if necessary.

It has been found that the hot wire can be readily mounted on apparatus as an additional low cost item and it will effectively function to increase the operating efficiency of the apparatus. Since the molded parts are removed more quickly, the use of the device permits the plastic molding apparatus to be operated at its maximum speed.

I claim:

1. Injection plastic molding apparatus comprising a pair of dies, said dies forming therebetween an aperture, means moving said dies toward and away from one another horizontally relative to one another between a closed molding position and an opened position, a nozzle, means moving said nozzle vertically toward and away from said aperture such that said nozzle is engageable with said dies for injecting plastic into the cavities thereof when the dies are in closed position and movable away from said dies so that when the dies are opened and the parts are ejected from the molds, a fine drool of plastic may occur between the nozzle and the part, a hot wire, means rigidly mounting said wire on one of said dies, said wire extending from one of said dies to substantially surround said aperture so that when the dies are moved relative to one another to an open position, the hot wire will engage any drool of plastic, and means operable to energize the wire at a temperature sufficient to melt and sever the drool when the means for moving said dies is actuated to open said dies permitting the part to fall under the action of gravity.

2. The combination set forth in claim 1 wherein said hot wire comprises an arcuate loop of wire.

3. The combination set forth in claim 1 wherein said means for mounting said wire includes a mounting member comprising a glass fiber impregnated plastic base, a layer of copper on said base and a layer of insulating paint over said copper, means for mounting said wire on said copper layer.

4. The combination set forth in claim 3 wherein portions of said paint and said copper are removed to permit direct attachment of said base to said die.

5. The combination set forth in claim 1 wherein one of said dies is stationary, said hot wire being mounted on said stationary die.

6. The combination set forth in claim 1 wherein one of said dies is movable, said hot wire being mounted on said movable die.

* * * * *